UNITED STATES PATENT OFFICE.

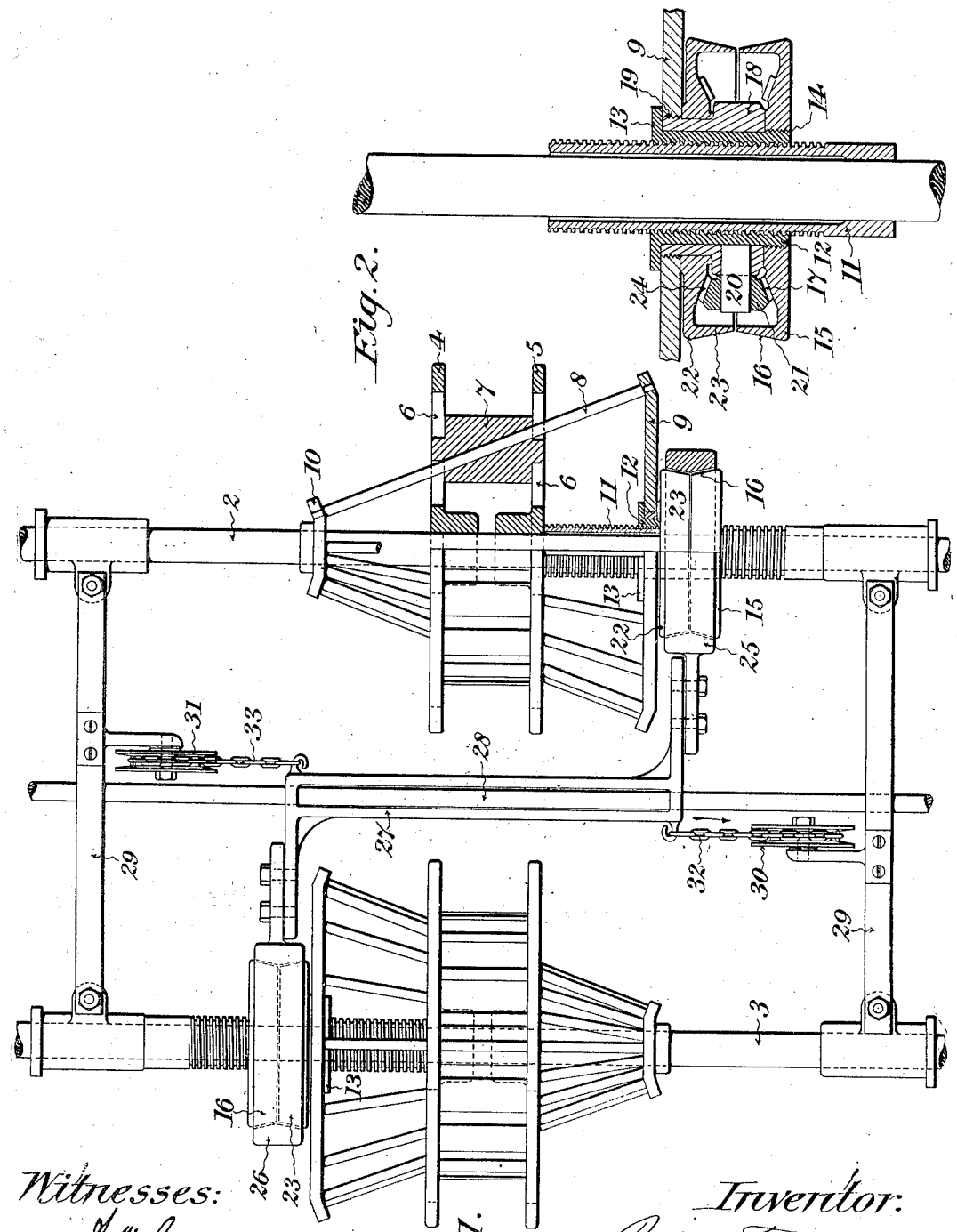

ROBERT TEMPLE, OF DENVER, COLORADO, ASSIGNOR TO THE AMERICAN EXPANSION PULLEY COMPANY, OF DENVER, COLORADO, A CORPORATION OF COLORADO.

EXPANSIBLE PULLEY.

SPECIFICATION forming part of Letters Patent No. 692,219, dated January 28, 1902.

Application filed May 25, 1901. Serial No. 61,950. (No model.)

*To all whom it may concern:*

Be it known that I, ROBERT TEMPLE, a citizen of the United States, residing at Denver, in the county of Arapahoe and State of Colorado, have invented a certain new and useful Improvement in Expansible Pulleys, of which the following is a full, clear, and exact description.

My invention relates to means for operating any expansible pulley requiring a longitudinal movement along its shaft to effect its expansion and contraction.

Usually in a variable-speed device a pair of expansible pulleys are used, and it is necessary in varying speed to contract one pulley simultaneously and concurrently with the expansion of the other, to which it is belted. To effect this automatically by the power of the revolving shafts to which the pulleys are attached and which revolve at varying speeds and to avoid continual end thrusts and continual wear of the operating mechanism are the main objects of my invention. In illustrating these objects of my invention I have shown a pair of expansible pulleys constructed, essentially, in accordance with the invention in my Patent No. 647,429, dated April 10, 1900; but I wish to state at the outset that I do not limit my invention to the particular construction of pulleys as such therein or herein shown, but esteem my invention as applicable to expansible pulleys of various constructions.

The invention consists of a pulley-moving medium comprising, essentially, a friction-clutch mounted upon a pulley-shaft and positively connected with the pulley in such way that by movement of the clutch longitudinally of the shaft in opposite directions the pulley may be respectively expanded and contracted, all as I will proceed now more particularly to set forth and finally claim.

In the accompanying drawings, illustrating my invention, in the two figures of which like parts are similarly designated, Figure 1 is a plan view with the right-hand pulley and part of the clutch in half-section; and Fig. 2 is a transverse section, on a larger scale, of the friction-clutch.

Before proceeding to describe the mechanism in detail I wish it to be understood once for all that my invention is not limited to a pair of expansible pulleys, and it is applicable to a single expansible pulley.

2 and 3 are shafts upon which the pulleys are mounted, and, as herein shown, these pulleys are alike and are of substantially the construction set forth in my patent previously referred to. Each pulley is composed of disks 4 and 5, having radial slots 6, these disks being fixed to the respective shafts. In these disks are mounted the sector-blocks 7, pierced obliquely for the passage of the rods 8 of the cone of rods, which cone of rods is composed of such rods and the heads 9 and 10, mounted upon the shafts and in such manner that the cone of rods is capable of longitudinal movement on the shaft in order to expand and contract the pulleys by the consequent movement outwardly or inwardly of the sector-blocks 7. Since the mechanism for sliding the cones of rods of a pair of expansible pulleys is the same for each pulley, excepting for the fact of reversal of position, and since the operating mechanism, as already intimated, is applicable to one pulley or a pair of pulleys, I will describe its mechanism as applied to a single pulley.

Instead of mounting the head 9 of the cone of rods directly upon the shaft, as in the patent previously referred to, I secure to the shaft and to turn with it a screw-threaded sleeve 11, and upon this sleeve is a nut 12, which is flanged at 13 over upon the head 9. The nut has fixed to it, as by a screw-thread 14 or other means, a disk 15, having a peripheral flange 16 in the form of a truncated cone. This disk is supplied with a bevel-gear 17. Loosely mounted upon the nut 12 is a hub 18, to which is rigidly fixed the head 9, as by means of a screw-thread 19. This hub is provided with a stud-shaft 20, upon which is mounted a bevel-pinion 21, which meshes with the bevel-gear 17 of the disk 15. A disk 22 is loosely mounted upon the hub 18 and is likewise made with a peripheral flange 23 in the form of a truncated cone, the reverse of the contour of the flange 16, and this disk 22 is supplied with a bevel-gear 24, with which also meshes the bevel-pinion 21. A brake-ring 25, having its inner surface of the contour of the peripheral flanges of the disks 15 and 22 and of somewhat larger diameter, encircles the said flanges and is adapted to be moved laterally into contact with one flange, and thereby out of contact with the other, so as to cause one or the other of the disks 15 and 22 to stop revolving with their shaft.

The operation of the mechanism, which can take place only when the shaft is revolving, is as follows: Upon bringing the brake-ring 25 in contact with the flange 16 the disk 15 is prevented from revolving with the shaft 2, and thereby being held with reference to the turning of the threaded sleeve 11 is forced along the shaft in the direction in which the brake-ring is pulled and will continue its movement longitudinally in the same direction as long as the brake-ring is held in contact with the flange 16. The hub 18, revolving always with the pulley-shaft and carrying the pinion 21, which meshes with the gears 17 and 24, causes the disk 22 to revolve with double the speed of the hub 18, while the brake is applied to flange 16 on disk 15. Upon bringing the brake-ring in contact with the flange 23, thereby stopping the disk 22, the pinion 21, revolving with the speed of the pulley-shaft, will accelerate the disk 15 to twice the speed of the pulley-shaft. This will cause said disk to travel longitudinally along the threaded sleeve 11 in the same direction as that in which the brake is now being pulled, and therefore in the opposite direction to that in which it moved when the brake was applied to the flange 16 of disk 15. Thus it will be seen that the whole mechanism is so built together upon the threaded nut 12 that it must always move longitudinally along the shaft with it.

From the above description of the action that takes place in the operation of a single pulley it will be readily understood how a pair of these pulleys can be operated simultaneously and concurrently by having these brake-rings 25 and 26, which operate the two pulleys, either rigidly connected, so that they must move together, or operated harmoniously or in unison by some simple mechanism. One means for operating the two pulleys harmoniously by connecting the two brake-rings rigidly together is shown in the drawings, Fig. 1. The two brake-rings 25 and 26 are connected by a rigid frame 27, sliding along a guide 28, or by any other suitable means. This guide 28 is attached to the frame 29 29, which supports the bearings for the shafts 2 and 3, and to this frame are attached pulleys 30 31, over which pass chains 32 33, respectively connected to opposite ends of the sliding frame 27. When the chain 32, attached to the frame 27, is pulled in the direction indicated by the arrow opposite it, the said frame follows in the same direction, thereby applying the brake-rings to the flanges 16 and 23 of opposite pulleys. This brake action carries the operating mechanism of the two pulleys in the same direction, and so changes the sizes of the two pulleys, expanding one while contracting the other. When the chain 33 is pulled so as to move the frame 27 in the opposite direction, thus applying the brake-rings to the flanges 23 and 16 of opposite pulleys, the operating mechanism of the two pulleys will likewise be moved in this opposite direction, contracting the pulley which was expanded before and expanding the other pulley. Although the shafts 2 and 3 may revolve at different speeds, yet as the brake-rings must move longitudinally together the speed of this motion is always determined by the shaft revolving the slowest. The more rapidly revolving shaft upon the application of the brake tends to move the mechanism faster than the shaft revolving more slowly; but the movement of this operating mechanism upon the two pulleys is kept practically concurrent and equal from the fact that the slightest tendency of one to advance faster than the other partially disconnects the brake that causes its advance, allowing the brake-surface (flange) to slip enough to compensate for the difference in speed. The direction of the thread of the screws is so arranged that the operating mechanism moves in the same direction longitudinally as that in which the brake is applied. Thus the brakes always follow up the movement of the operating mechanism when the same is effecting the expansion or contraction of the pulleys.

One of the most important features of my invention is the expanding and contracting of the two pulleys of a pair of pulleys simultaneously and at the same rate by their own revolutions, although they revolve at different and varying speeds. It is evident that all end thrust and continual wear of the operating mechanism are avoided, because the whole revolves together with no wear upon operating mechanism except when the operating mechanism is in actual use, which is only during brief intervals.

It will be understood from the foregoing that the brake-ring, the two flanged disks with which said brake-ring coöperates, and the means for connecting one or the other of these disks operatively with the shaft and pulley constitute what is hereinbefore and hereinafter designated a "clutch."

What I claim is—

1. An expansible pulley, and means to actuate it comprising essentially a clutch having independent flanged disks, means through which said clutch may be moved longitudinally of its supporting-shaft, means to connect one or the other of said disks operatively with the pulley, and a brake-ring for rendering operative one or the other of said flanged disks.

2. An expansible pulley, a shaft upon which it is mounted, and a clutch connected with the expanding member of said pulley to move it longitudinally of the shaft, and comprising essentially independent flanged disks, one of which has a screw-threaded connection with the shaft and the other is carried loosely on said shaft, interposed gearing between said disks, and means to render one or the other of said disks operative at pleasure to effect a longitudinal movement of the expanding member of the pulley.

3. A shaft having a screw-threaded sleeve fast thereon, an expansible pulley mounted upon said shaft and its expanding member movable longitudinally of said shaft, a nut applied to said sleeve and to the expanding member, a clutch having one of its members fixed to said nut and its other member loose thereon, gearing interposed between said clutch members, and means to render one or the other of said clutch members operative to effect the movement of the expanding member longitudinally of the shaft and in opposite directions.

4. An expansible pulley, a shaft upon which it is mounted, and a clutch connected with the expanding member of said pulley to move it longitudinally of the shaft, and comprising essentially independent flanged disks, one of which has a screw-threaded connection with the shaft and the other is carried loosely on said shaft, interposed gearing between said disks, and means to render one or the other of said disks operative at pleasure to effect a longitudinal movement of the expanding member of the pulley, the gearing being proportioned to accelerate the rotation of one of the disks over the rotation of the shaft.

5. A pair of expansible pulleys, shafts upon which they are mounted independently, a clutch mechanism for each pulley, connections between the clutch mechanism and the expanding mechanism thereof, a screw-threaded connection of one member of each pulley with its appropriate shaft, a loose connection of the other clutch member with said shaft, interposed gearing between said members, means to brake one or the other of said clutch members, and an operating mechanism connecting the said braking mechanism to effect the adjustment of the two pulleys simultaneously and at the same rate by their own revolutions, and while revolving at different and varying speeds.

6. Actuating mechanism for expansible pulleys, comprising a rotary shaft, a screw-threaded sleeve fast to said shaft, and a complemental nut mounted upon said sleeve and connected with the pulley, a flanged disk fast to said nut, an independent flanged disk mounted loosely relatively to the nut, differential gearing interposed between said disks, and means alternately to brake one or the other of said disks and thereby render the gearing effective to cause the nut to travel lengthwise of the sleeve in opposite directions.

7. Actuating mechanism for expansible pulleys, comprising essentially a shaft, a screw-threaded sleeve fast thereon, a complemental nut mounted upon said sleeve and engaging the pulley, a flanged disk having a fixed gear and fast to the said nut, a hub and pinion thereon meshing with the said gear, and an independent flanged disk, also having a gear, mounted loosely upon the said hub and likewise engaged by the pinion, and means to brake one of said disks and thereby render the gearing effective to cause the said actuating mechanism to travel longitudinally of the shaft and at an increased speed over the revolution of the shaft.

In testimony whereof I have hereunto set my hand this 21st day of May, A. D. 1901.

ROBERT TEMPLE.

Witnesses:
FREDERICK O. VAILLE,
ALBERT A. ALEXANDER.